(12) United States Patent
Baghdasarian et al.

(10) Patent No.: US 10,479,534 B1
(45) Date of Patent: Nov. 19, 2019

(54) ROTATABLE STACKED SPACECRAFT (71) Applicant: Space Systems/Loral, LLC, Palo Alto, CA (US)

(72) Inventors: Varouj G. Baghdasarian, Cupertino, CA (US); Andrew E. Turner, Mountain View, CA (US); Albert L. Weitzel, Milpitas, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 278 days.

(21) Appl. No.: 15/488,166

(22) Filed: Apr. 14, 2017

(51) Int. Cl.
| B64G 1/64 | (2006.01) |
| B64G 1/00 | (2006.01) |
| B64G 1/22 | (2006.01) |
| B64G 1/40 | (2006.01) |
| B64G 1/10 | (2006.01) |

(52) U.S. Cl.
CPC ............ *B64G 1/641* (2013.01); *B64G 1/007* (2013.01); *B64G 1/10* (2013.01); *B64G 1/222* (2013.01); *B64G 1/402* (2013.01); *B64G 2001/643* (2013.01)

(58) Field of Classification Search
CPC .......... B64G 1/641; B64G 1/64; B64G 1/222; B64G 1/007; B64G 1/402; B64G 1/10; B64G 2001/643
USPC ...................................................... 244/158.5
See application file for complete search history.

(56) References Cited

U.S. PATENT DOCUMENTS

| 4,747,567 A | * | 5/1988 | Johnson | ................. B64G 1/222 136/245 |
| 5,199,672 A | | 4/1993 | King et al. | |
| 5,613,653 A | * | 3/1997 | Bombled | ............... B64G 1/641 244/173.1 |
| 6,439,511 B1 | * | 8/2002 | Ingersoll, Jr. | ............ B64G 1/44 244/172.7 |
| 8,789,797 B2 | | 7/2014 | Darooka | |
| 8,915,472 B2 | | 12/2014 | Aston et al. | |
| 9,180,984 B2 | | 11/2015 | Peterka et al. | |
| 2002/0179776 A1 | * | 12/2002 | Mueller | ................. B64G 1/007 244/158.5 |

(Continued)

FOREIGN PATENT DOCUMENTS

WO WO 2016/030890 3/2016

*Primary Examiner* — Claude J Brown
(74) *Attorney, Agent, or Firm* — Weaver Austin Villeneuve & Sampson LLP (57) ABSTRACT

A system includes at least two spacecraft disposed together for launch by a launch vehicle. In a launch configuration, a second spacecraft is mechanically coupled with the first spacecraft by way of an inter-spacecraft coupling arrangement (ISCA). The system is configured to be deployed following injection into a first orbit by the launch vehicle, while the second spacecraft is mechanically coupled with the first spacecraft. The first spacecraft includes a thruster configured to execute an orbit transfer maneuver from the first orbit to a second orbit, the thruster delivering thrust along a thrust vector. In an on-orbit configuration, the ISCA is switchable between a first mode that permits rotation of the first spacecraft with respect to the second spacecraft about a first axis of rotation that is approximately parallel with the thrust vector and a second mode that prevents rotation of the first spacecraft with respect to the second spacecraft.

17 Claims, 7 Drawing Sheets

(56) References Cited

U.S. PATENT DOCUMENTS

| | | | |
|---|---|---|---|
| 2004/0135035 A1* | 7/2004 | Peck | B64G 1/002 |
| | | | 244/165 |
| 2009/0108138 A1* | 4/2009 | Mintz | B64G 1/222 |
| | | | 244/173.3 |
| 2012/0303185 A1* | 11/2012 | Munir | G05D 1/0883 |
| | | | 701/13 |
| 2013/0221162 A1* | 8/2013 | Darooka | B64G 1/10 |
| | | | 244/173.1 |
| 2013/0327895 A1* | 12/2013 | Aston | B64G 1/641 |
| | | | 244/173.3 |
| 2014/0061386 A1* | 3/2014 | Peterka, III | B64G 1/002 |
| | | | 244/171.5 |
| 2014/0239125 A1* | 8/2014 | Aston | B64G 1/002 |
| | | | 244/172.3 |
| 2015/0028159 A1 | 1/2015 | Vichnin et al. | |
| 2016/0304219 A1 | 10/2016 | Tadros et al. | |
| 2016/0318635 A1* | 11/2016 | Field | B64G 1/641 |
| 2018/0162561 A1* | 6/2018 | Estevez | B64G 1/002 |

* cited by examiner

Detail C

Detail D

Figure 5B

Detail E

Detail F

ROTATABLE STACKED SPACECRAFT

TECHNICAL FIELD

This invention relates generally to a launch vehicle payload, including two or more spacecraft configured to be launched within a common fairing of the launch vehicle, and more particularly to a stacked configuration of two or more spacecraft selectively rotatable with respect to each other.

BACKGROUND

The assignee of the present invention designs and manufactures spacecraft for communications and broadcast services. Such spacecraft are frequently required to undergo orbit transfer from a first orbit to a second orbit. For example, the spacecraft may undergo orbit raising from an initial orbit (into which the spacecraft is disposed by a launch vehicle, for example) to an operational orbit.

Such spacecraft may be equipped with on board propulsion systems, including chemical or electric thrusters, for orbit raising from a launch vehicle transfer orbit (or "parking orbit") to an operational orbit, for example, to a geosynchronous orbit, as well as for stationkeeping once disposed in the operational orbit, and for attitude control/momentum management purposes.

Spacecraft propulsion systems generally include thrusters, which may be broadly categorized as either "chemical" or "electric" based on the respective primary energy source. Chemical thrusters suitable for spacecraft propulsion systems may deliver relatively high thrust of 10-1000 newtons, for example, substantially irrespective of spacecraft power limitations, but such thrusters are generally incapable of operating at a specific impulse ($I_{sp}$) higher than 500 seconds. Electric thrusters may operate at an $I_{sp}$ of 1000-4000 seconds, but spacecraft power availability typically constrains thrust levels to less than one newton.

It is sometimes desirable to configure two or more spacecraft for simultaneous launch on a single launch vehicle. As disclosed in US patent publication number 2016/0304219, assigned to the assignee of the present invention, two or more spacecraft configured to be launched within a common fairing of the launch vehicle may be configured in a stacked launch configuration where at least a portion of orbit raising is performed with the two or more spacecraft coupled together. One of the stacked spacecraft may provide most or all of the orbit transfer capability for the stack of spacecraft.

SUMMARY

The presently disclosed techniques increase electrical power generation by solar arrays of a stacked arrangement of two or more spacecraft, by reducing or preventing shadowing of a solar array of one spacecraft by a solar array of another spacecraft in the stack. The disclosure contemplates that one or more spacecraft, in a stack of two or more spacecraft launched together on a launch vehicle, may rotate with respect to the remainder of the stack following deployment from the launch vehicle.

According to some implementations, a system includes at least two spacecraft, including at least a first spacecraft and a second spacecraft, the at least two spacecraft disposed together, in a launch configuration, for launch by a single launch vehicle in the launch configuration, the first spacecraft is mechanically coupled with a primary payload adapter of the launch vehicle, and the second spacecraft is mechanically coupled with the first spacecraft by way of an inter-spacecraft coupling arrangement. The system is configured to be deployed following injection into a first orbit by the launch vehicle, by separating the first spacecraft from the primary payload adapter while the second spacecraft is mechanically coupled with the first spacecraft. The first spacecraft includes a thruster configured to execute an orbit transfer maneuver from the first orbit to a second orbit, the thruster delivering thrust along a thrust vector. In an on-orbit configuration, the inter-spacecraft coupling arrangement is switchable between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation.

In some examples, each spacecraft may include a respective solar array, each respective solar array having a respective axis of rotation that is substantially orthogonal to the thrust vector.

In some examples, the first axis of rotation may be approximately co-aligned with the thrust vector.

In some examples, the inter-spacecraft coupling arrangement may include one or both of flexible cabling and flexible propellant lines interconnecting the first spacecraft and the second spacecraft.

In some examples, the inter-spacecraft coupling arrangement may be configured to commandably release and separate the second spacecraft from the first spacecraft.

In some examples, in the launch configuration, the inter-spacecraft coupling arrangement may fixedly couple the first spacecraft with respect to the second spacecraft.

In some examples, the inter-spacecraft coupling arrangement may include a V-band clamp.

In some examples, the inter-spacecraft coupling arrangement may include a motorized mechanism for rotating the first spacecraft with respect to the second spacecraft.

In some examples, the inter-spacecraft coupling arrangement may exclude any mechanism for rotating the first spacecraft with respect to the second spacecraft.

In some examples, the system may include one or more thrusters or other attitude control actuators configured to rotate the first spacecraft with respect to the second spacecraft.

According to some implementations, a method includes: (i) deploying a payload stack from a launch vehicle, the payload stack including at least a first spacecraft and a second spacecraft, the first spacecraft and the second spacecraft configured to be disposed together, in a launch configuration, for launch by the launch vehicle, wherein deploying the payload stack includes separating the first spacecraft from the launch vehicle while the second spacecraft is mechanically coupled with the first spacecraft by way of an inter-spacecraft coupling arrangement; (ii) executing an orbit transfer maneuver by performing one or more firings of a thruster delivering thrust along a thrust vector; and (iii) switching the inter-spacecraft coupling arrangement between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation.

In some examples, each spacecraft may include a respective solar array, each respective solar array having a respective axis of rotation that is substantially orthogonal to the thrust vector.

In some examples, the method may further include rotating the first spacecraft with respect to the second spacecraft about the first axis of rotation.

In some examples, the inter-spacecraft coupling arrangement may include one or both of flexible cabling and flexible propellant lines interconnecting the first spacecraft and the second spacecraft.

In some examples, the inter-spacecraft coupling arrangement may be configured to commandably release and separate the second spacecraft from the first spacecraft.

In some examples, the inter-spacecraft coupling arrangement may include a motorized mechanism for rotating the first spacecraft with respect to the second spacecraft.

According to some implementations, a first spacecraft includes a thruster and an inter-spacecraft coupling arrangement. The first spacecraft is configured to be launched, by a single launch vehicle, with a second spacecraft. In a launch configuration, the first spacecraft is mechanically coupled with a primary payload adapter of a launch vehicle; and the second spacecraft is mechanically coupled with the first spacecraft by way of an inter-spacecraft coupling arrangement. Following injection into a first orbit by the single launch vehicle, the first spacecraft is separated from the primary payload adapter while the second spacecraft is mechanically coupled with the first spacecraft. The thruster is configured to execute an orbit transfer maneuver from the first orbit to a second orbit, the thruster delivering thrust along a thrust vector. In an on-orbit configuration, the inter-spacecraft coupling arrangement is switchable between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation.

In some examples, each of the first spacecraft and the second spacecraft may include a respective solar array, each respective solar array having a respective axis of rotation that is substantially orthogonal to the thrust vector.

In some examples, the inter-spacecraft coupling arrangement may include one or both of flexible cabling and flexible propellant lines interconnecting the first spacecraft and the second spacecraft.

In some examples, the inter-spacecraft coupling arrangement may be configured to commandably release and separate the second spacecraft from the first spacecraft.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or interveninge feature s may be present. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The presently disclosed techniques increase electrical power generation by solar arrays of a stacked arrangement of two or more spacecraft, by reducing or preventing shadowing of a solar array of one spacecraft by a solar array of another spacecraft in the stack. The disclosure contemplates that one or more spacecraft, in a stack of two or more spacecraft launched together on a launch vehicle, may rotate with respect to the remainder of the stack following deployment from the launch vehicle. In some implementations, an inter-spacecraft coupling arrangement may be configured to rigidly couple two adjoining spacecraft together during the launch phase. Following separation of the stack of two or more spacecraft from the launch vehicle, one or more orbit raising maneuvers may be performed by firing, for example, one or more electric thrusters. Firing the one or more electric thrusters may produce a thrust vector pointing approximately along a roll axis of the stack. The roll axis of the stack corresponds to the roll axis of the launch vehicle, which is parallel to the longitudinal axis of the launch vehicle. The inter-spacecraft coupling arrangement may be reconfigured such that at least one spacecraft may be rotated, relative to one or more other spacecraft in the stack, around the roll axis. As a result, shadowing of solar array panels of one spacecraft by the solar array panels of another spacecraft in the stack can be reduced or eliminated.

In some implementations, the inter-spacecraft coupling arrangement may include a V-band ("Marman") clamp interface that includes provisions for switchably reconfiguring between a launch configuration and an orbit raising configuration. In the launch configuration, the inter-spacecraft coupling arrangement may be configured to provide a rigid coupling between adjoining spacecraft. In the orbit raising configuration, the inter-spacecraft coupling and arrangement is switchable between a first mode and a second mode. In the first mode, the inter-spacecraft coupling arrangement permits rotation of a first spacecraft with respect to an adjoining spacecraft about the roll axis. In the second mode, the inter-spacecraft coupling arrangement prevents rotation of the first spacecraft with respect to the adjoining spacecraft about the roll axis.

Figure 1:
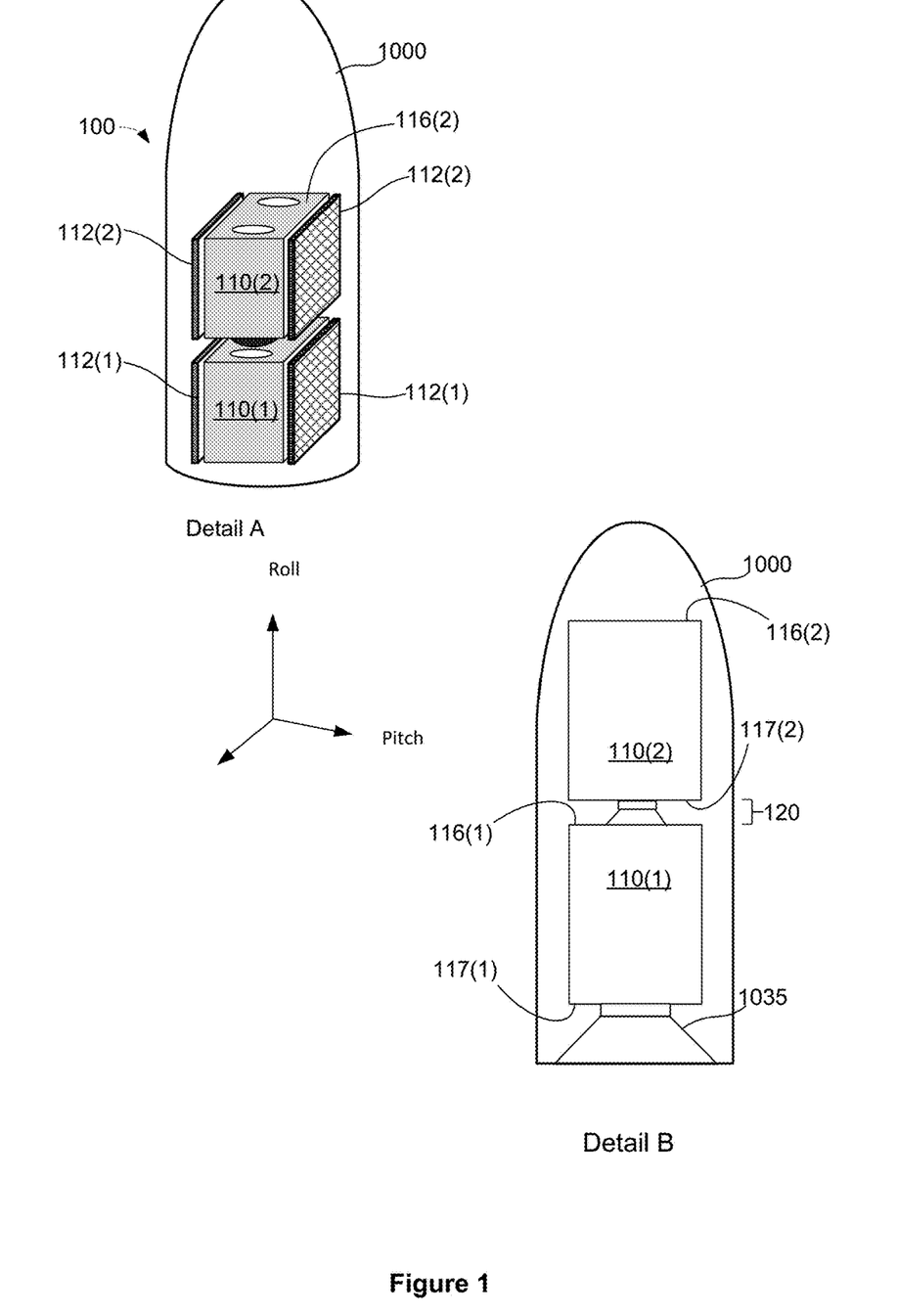
FIG. 1 illustrates a system including two spacecraft in a stacked launch configuration, according to an implementation.

FIG. 1 illustrates a system including two spacecraft in a stacked launch configuration, Detail A depicting an isometric view, Detail B depicting an elevation view. It may be observed that the stacked spacecraft system 100 includes a lower (aft) spacecraft 110(1) coupled with an upper (forward) spacecraft 110(2) by way of an inter-spacecraft coupling arrangement 120. As illustrated, in the launch configuration, the stacked spacecraft system 100 may be disposed within a fairing 1000 of a launch vehicle that includes a primary payload adapter 1035. Each spacecraft 110 may include a respective pair of solar arrays 112, shown, in the launch configuration, stowed close to a respective spacecraft sidewall.

Figure 2:
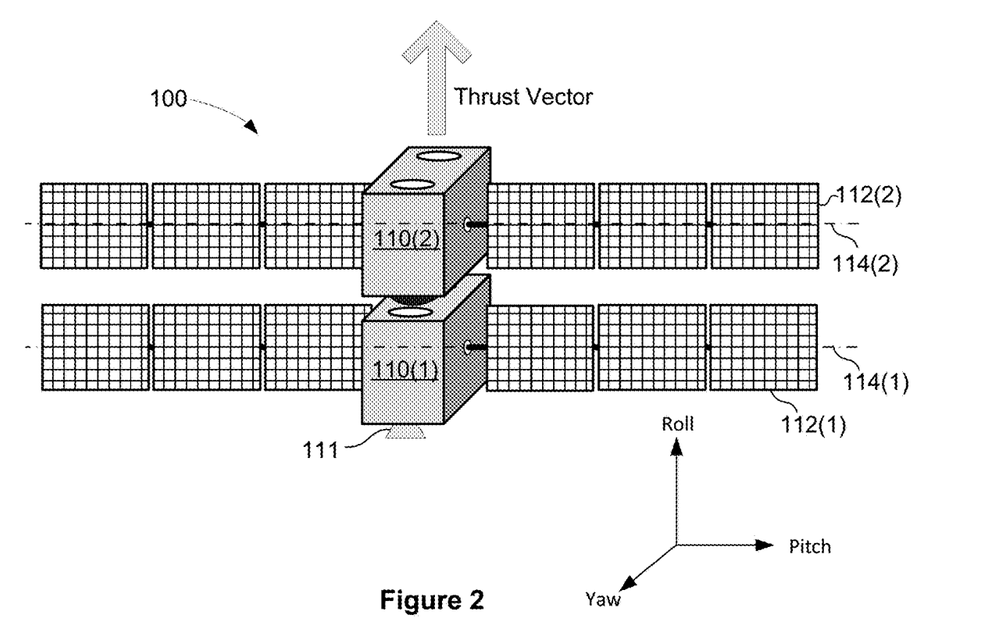
FIG. 2 illustrates the stacked spacecraft system in a first configuration suitable for an orbit transfer maneuver.

FIG. 2 illustrates the stacked spacecraft system 100 in a first configuration suitable for an orbit transfer maneuver. In the illustrated orbit transfer configuration, the solar arrays 112 of both spacecraft 100 are depicted as being fully deployed. Each solar array 112 may be configured to rotate about a respective axis of rotation 114. More particularly, solar array 112(1) may rotate about axis of rotation 114(1) and solar array 112(2) may rotate about axis of rotation 114(2). The aft spacecraft 100(1) includes at least one thruster 111. The at least one thruster 111 may produce a thrust vector pointing approximately through the spacecraft center of mass, and approximately aligned with the roll axis of the system 100. In the case of two or more thrusters 111, it will be understood that a synthetic thrust vector through the center of mass and aligned with the roll axis may be produced by simultaneous firing of the two or more thrusters 111. The axes of rotation 114 will ordinarily be orthogonal to the thrust vector. In the orbit raising configuration depicted in Detail C, each of the axes of rotation 114(1) and 114(2) are also parallel to the pitch axis (i.e., orthogonal to the orbit plane). Advantageously, where the at least one thruster 111 is an electric thruster, it may draw electrical power generated by solar arrays of both spacecraft.

During an orbit transfer maneuver, particularly where the at least one thruster 111 is an electric thruster, it is desirable to maintain the solar arrays 112 in a sun-facing orientation in order to maximize electrical power generation. This may be accomplished by appropriate rotation of the solar arrays 112 about the respective axes of rotation 114 and by rotation of the system 100 about the roll axis. During portions of the spacecraft system's orbit for which the direction to the sun ("sun vector") is substantially orthogonal to the roll axis, a problem of shadowing of a solar array of one spacecraft by the solar array of another spacecraft does not arise, and each solar array may receive unshadowed sunlight.

For some portions of at least most orbits, however, the sun vector may be expected have a substantial component parallel with the roll axis. As a result, the sun will appear, in the frame of reference of the system 100, to be forward of the forward spacecraft 110(2), or aft of the aft spacecraft 110(1). In the absence of the presently disclosed techniques, when the sun appears forward of the forward spacecraft 110(2), the solar array 112(2) may block sunlight from reaching the solar array 112(1), i.e., solar array 112(2) may "shadow" the solar array 112(1). Similarly, when the sun appears aft of the aft spacecraft 110(1), the solar array 112(1) may shadow the solar array 112(2).

Figure 3:
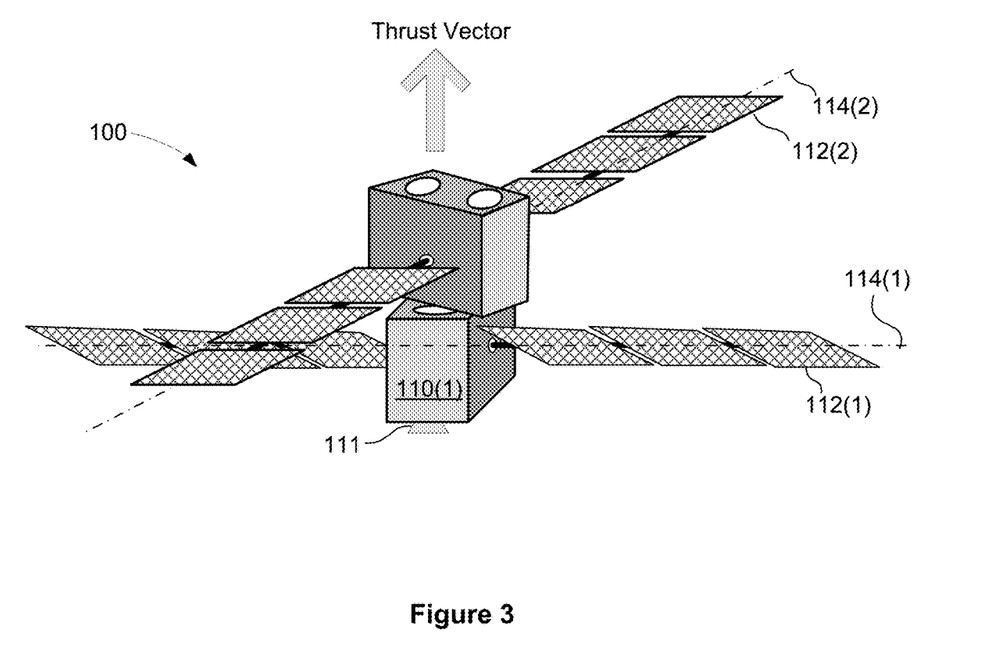
FIG. 3 illustrates the stacked spacecraft system 100 in a second configuration that substantially reduces shadowing, according to an implementation.

FIG. 3 illustrates the stacked spacecraft system 100 in a second configuration which substantially reduces shadowing, according to an implementation. In the illustrated implementation, spacecraft 110(2) is rotated with respect to spacecraft 110(1) such that the axis of rotation 114(1) of solar array 112(1) is at a substantial angle with respect to the axis of rotation 114(2) of solar array 112(2). As a result, a problem of shadowing may be substantially reduced or eliminated. As described hereinbelow, the relative rotation may be permitted or effectuated by an inter-spacecraft coupling.

Figure 4:
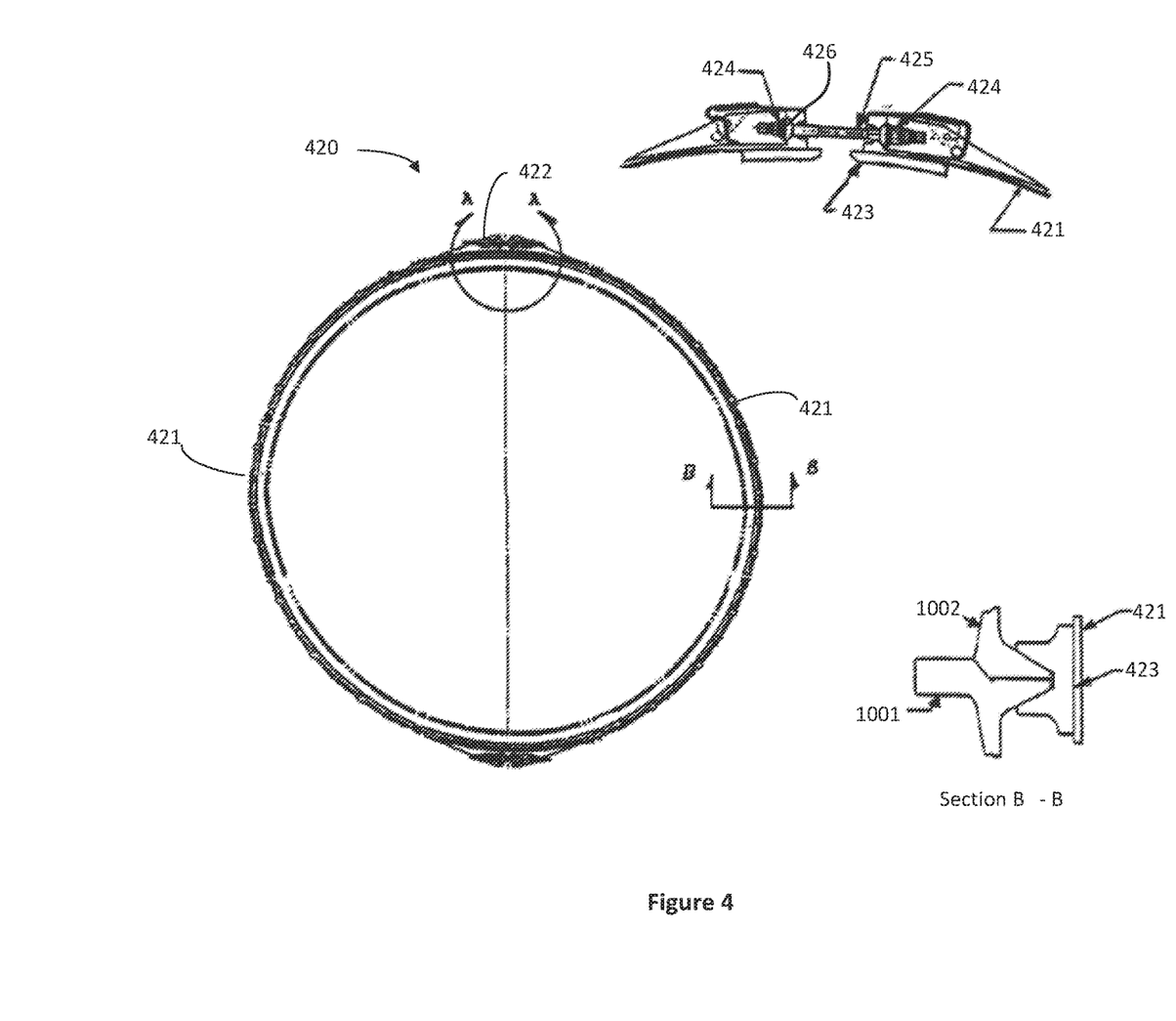
FIG. 4 illustrates a known band clamp arrangement.

In some implementations, the inter-spacecraft coupling includes a V-band clamp interface, often referred to as Marman clamp. Marman clamps for payload separation systems are described in "MARMAN CLAMP SYSTEM DESIGN GUIDELINES", NASA Preferred Reliability Practices Guideline No. GDED-2214, (hereinafter, "NASA Guidelines") the content of which is hereby incorporated by reference into the present application. Referring to FIG. 4, band clamp arrangement 420 may include one or more band clamps (sometimes referred to as "straps") 421 and tensioning devices 422. A number of V-segments (referred to herein as "shoes") 423 are arranged on the interior surface of clamp 421. Band clamp arrangement 420 is configured to encircle abutting cylindrical flanges on each of two parts that are affixed to each other. Tensioning device 422 may include a bolt or stud 425, nuts 424, and end fitting 426. Tensioning of band clamp 421 creates an inward radial restraining force on the shoes which in turn wedge together the abutting cylindrical flanges (i.e., 1001 and 1002) of the two parts to be joined in the axial direction. The two parts to be joined may, for example be pipes, interface flanges of structures or vehicles, including aerospace systems such as launch vehicles and launch vehicle payloads.

Figure 5A:
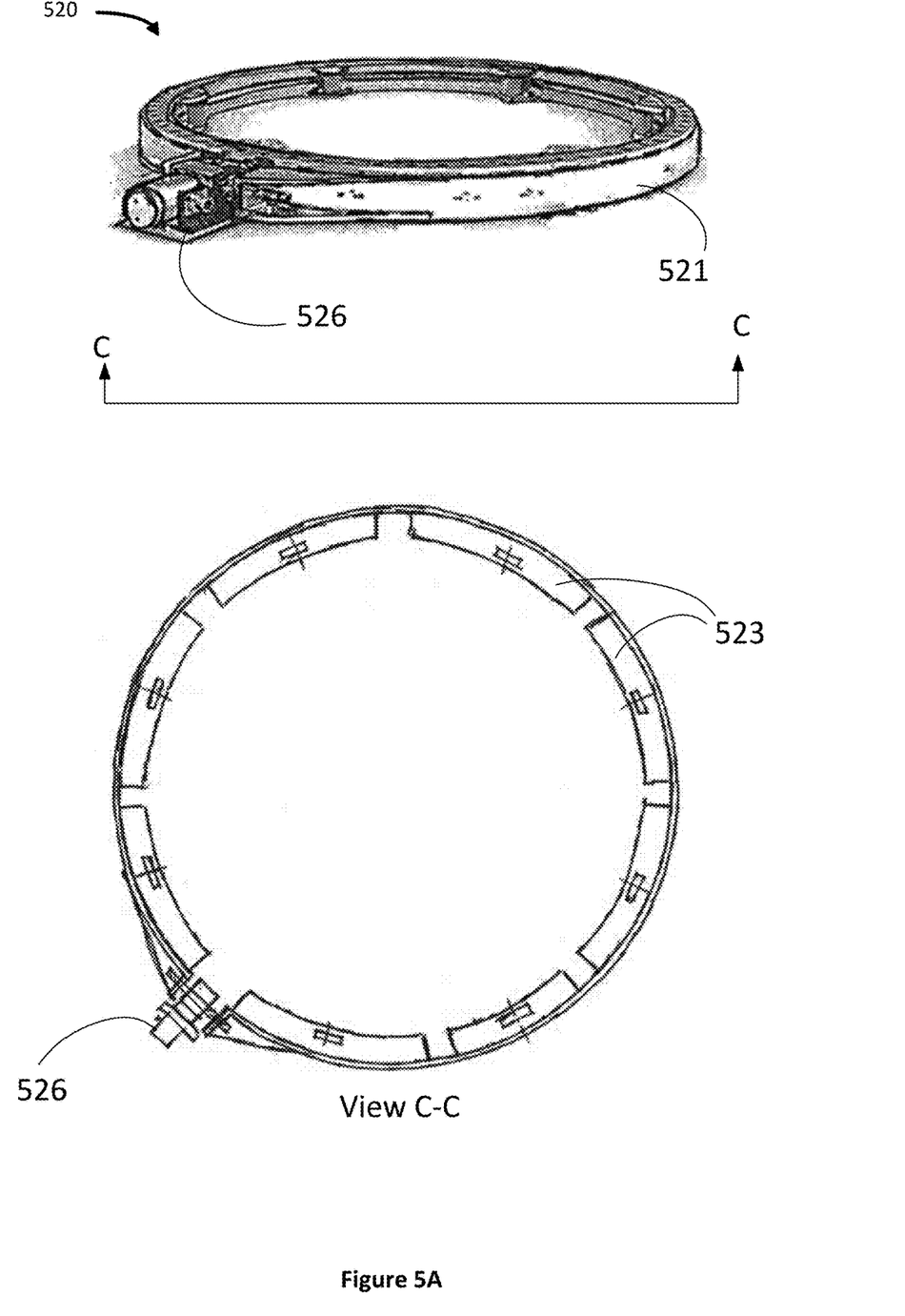
FIGS. 5A and 5B illustrate an inter-spacecraft coupling according to an implementation.
Figure 5B:
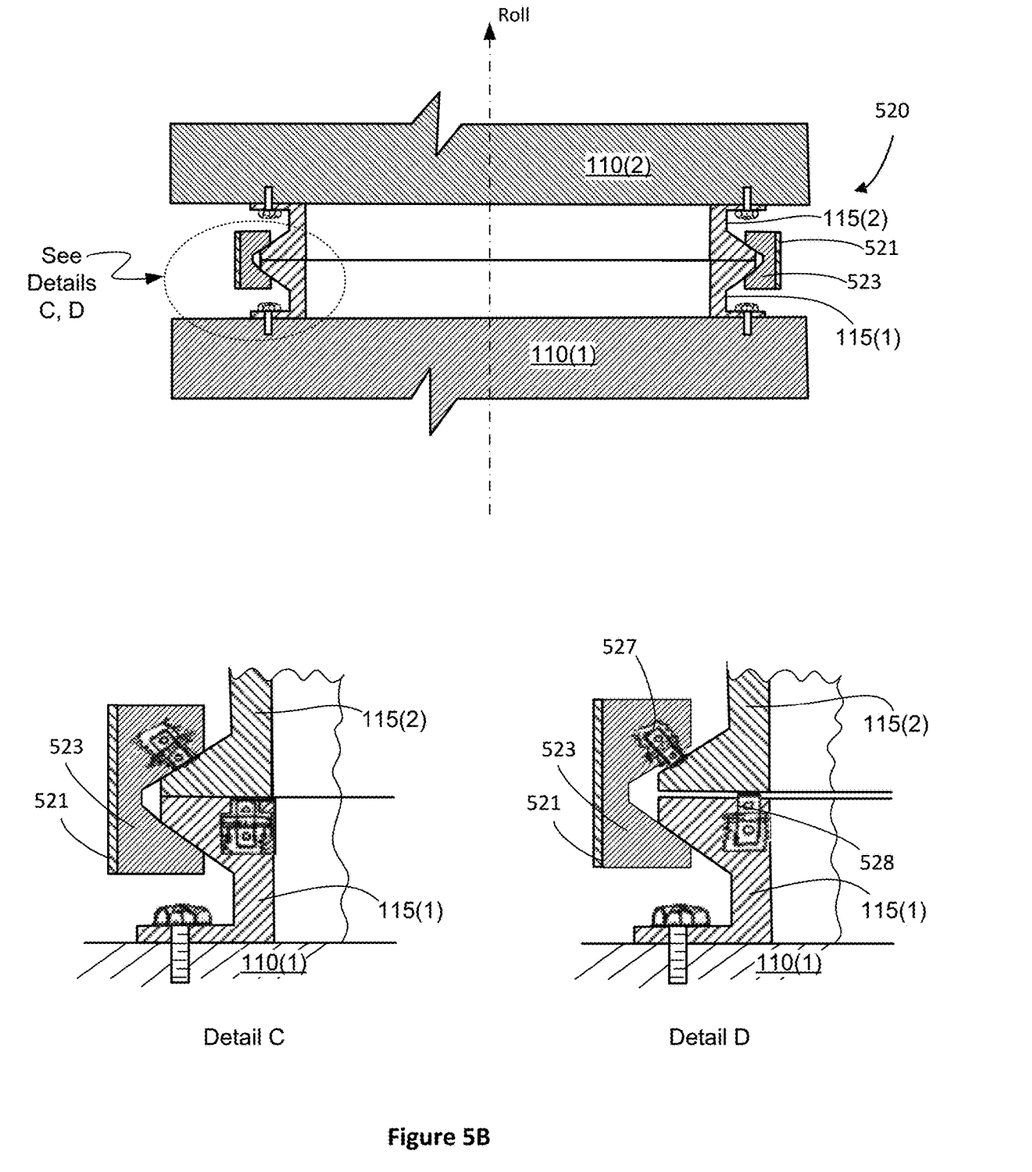

FIGS. 5A and 5B illustrate an inter-spacecraft coupling arrangement according to an implementation. The inter-spacecraft coupling arrangement 520 includes a clamp 521 and an actuator 526. The actuator 526 may include a tensioning/de-tensioning motor/gear arrangement that is configured to commandably reconfigure the inter-spacecraft coupling arrangement 520 between the launch configuration, the first on-orbit mode and the second on-orbit mode. The inter-spacecraft coupling arrangement 520 includes shoes 523 configured to engage with abutting cylindrical flanges of adapter rings, a first adapter ring disposed on a first spacecraft, a second adapter ring disposed on a second spacecraft.

Referring to FIG. 5B, the inter-spacecraft coupling arrangement 520 is shown to be disposed between a forward portion of the aft spacecraft 110(1) and an aft portion of the forward spacecraft 110(2). The aft spacecraft 110(1) includes an adapter ring 115(1), and the forward spacecraft 110(2) includes an adapter ring 115(2). The shoes 523 of the inter-spacecraft coupling arrangement 520 may be configured to engage abutting flanged surfaces of the adapter ring 115(1) and the adapter ring 115(2). As may be better observed in Detail C, in at least the launch configuration, the clamp 521 may be tensioned such that the shoes 523 tightly couple the adapter ring 115(1) with the adapter ring 115(2).

As may be better observed in Detail D, in at least one on-orbit configuration, the clamp 521 may be de-tensioned to the extent that the shoes 523 permit a slight gap between the adapter ring 115(1) with the adapter ring 115(2). At least some of the shoes 523 may include spring driven bearing assemblies ("bearings"). In the illustrated implementation, radial bearings 527 and lifting bearings 528 are shown to be urged by respective springs into respective gaps between the adapter ring 115(2) and shoe 523 and between adapter ring 115(1) and adapter ring 115(2). Such bearings may provide a low friction sliding interface. As a result, in the configuration illustrated in Detail D, a small amount of torque may be sufficient to induce rotary motion of spacecraft 110(1) with respect to spacecraft 110(2) about the roll axis.

A torque required to induce rotary motion of spacecraft 110(1) with respect to spacecraft 110(2) about the roll axis may be produced in some implementations by actuator 526 and/or by a separate actuator mounted on adaptor ring 115(1), or clamp band 523, that drives adaptor ring 115(2) with a pressure drive roller and/or a gear drive arrangement. Alternatively, or in addition, rotary torques may be produced by reaction wheels, thrusters, magnetic torquers, or other equipment on board one or both of the spacecraft 110(1) and the spacecraft 110(2). In some implementations, electrical cabling for power and/or telemetry and command, as well as propellant lines may be configured to through or across the inter-spacecraft coupling arrangement 520. The electrical cabling and/or the propellant lines may be configured to be flexible so as to reduce the amount of torque required to induce rotary motion of spacecraft 110(1) with respect to spacecraft 110(2).

The configuration illustrated in Detail D, referred to herein and in the claims as a "second on-orbit mode" is advantageously selected when it is desired to rotate one spacecraft with respect to an adjoining spacecraft in the stack. The configuration illustrated in Detail C, may advantageously be selected when it is desired to prevent rotation of one spacecraft with respect to an adjoining spacecraft in the stack. The configuration illustrated in Detail C may advantageously be selected when it is desired to prevent rotation of one spacecraft with respect to an adjoining spacecraft in the stack and may be referred to herein and in the claims as "a first on-orbit mode", although the configuration illustrated in Detail C may also result when the system 100 is in the launch configuration. Although the first on-orbit configuration and the launch configuration are visually similar, and may both be appreciated by examination of Detail C, the clamp 521 may be tensioned to a greater extent in the launch configuration, so the system is better able to withstand launch loads. In the first on-orbit configuration, in some implementations, the clamp 521 may be tensioned to a lesser extent than in the launch configuration, for example.

In an implementation, the inter-spacecraft coupling arrangement 520 may be switchable between (i) the first mode that permits rotation of the first spacecraft with respect to the second spacecraft about an axis of rotation that is approximately parallel with the thrust vector, and (ii) the second mode that prevents rotation of the first spacecraft with respect to the second spacecraft about the axis of rotation. Advantageously, the inter-spacecraft coupling arrangement 520 may be repeatedly switched between the first mode and the second mode a substantial number of times. The number of times it may be desirable to switch between modes may depend on the orbit transfer maneuver strategy as well as properties of the first orbit and the second orbit. For some orbit transfer scenarios, it may be desirable to switch between modes as often as twice per orbital revolution (several times per day) for a number of weeks or months. On the other hand, for some orbit transfer scenarios, only one or two switches between modes may be desirable.

Referring again to FIG. 1, in the illustrated implementation, each of the spacecraft 110(1) and 110(2) has a respective forward-facing surface 116 and aft-facing surface 117, each of the forward-facing surface 116 and the aft facing surface 117 being disposed transverse to the system's roll axis. The forward-facing surface 116(1) is shown to be coupled with the aft facing surface 117(2) by way of the inter-spacecraft coupling arrangement 120. The aft facing surface 117(1) is shown to be coupled with a launch vehicle upper stage by way of the primary payload adapter 1035. Subsequent to orbit transfer operations as a stacked system 100, the spacecraft 110(1) and 110(2) may be separated. After separation, each spacecraft 110(1) and 110(2) may be configured to operate in a respective operational orbit (for example, a geosynchronous orbit) with respective surfaces 116(1) and 116(2) oriented in the Earth-facing direction, e.g., toward nadir and respective surfaces 117(1) and 117(2) facing in the anti-Earth or zenith direction.

Figure 6:
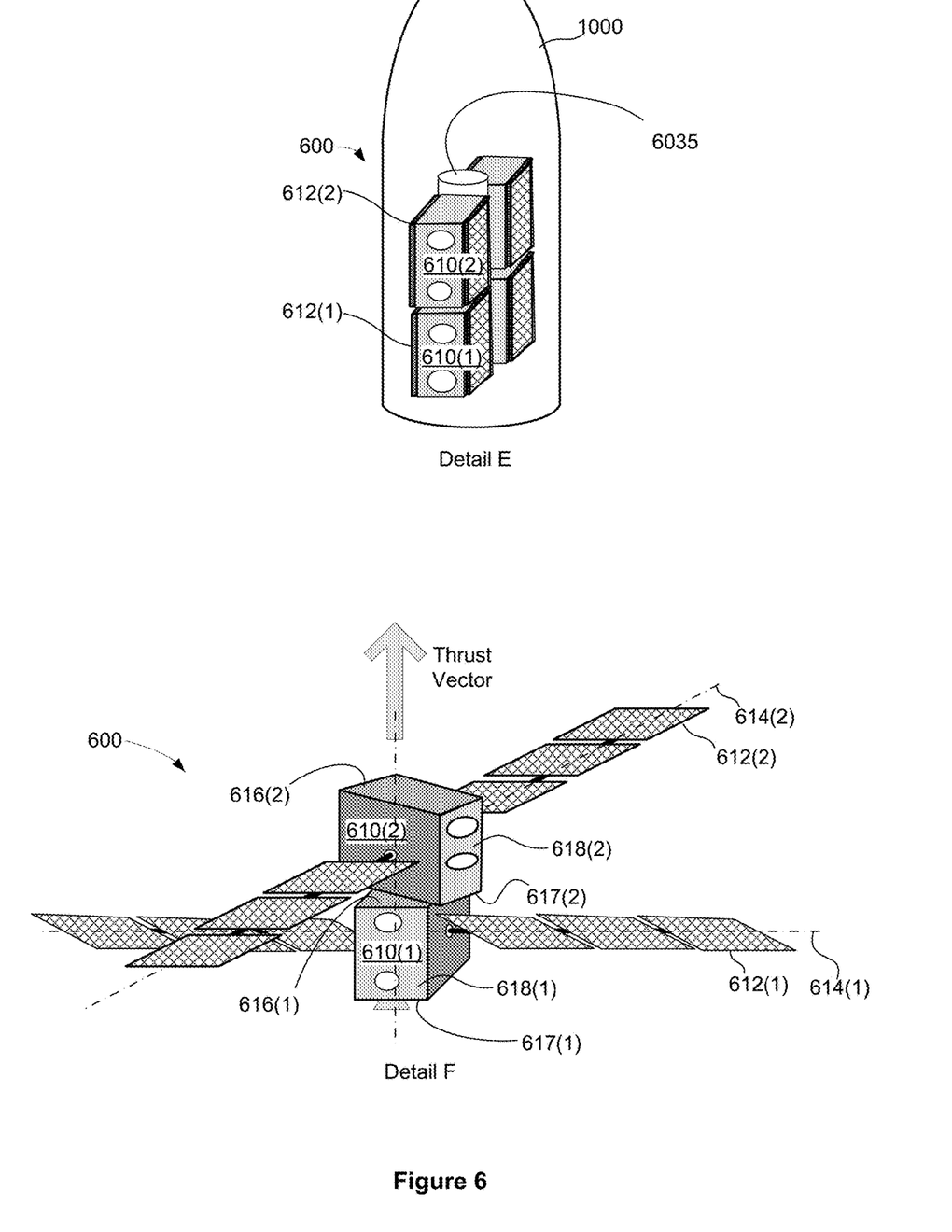
FIG. 6 illustrates a system including two spacecraft in a stacked launch configuration, according to an implementation.

Referring now to FIG. 6, a system is illustrated that includes two spacecraft according to another implementation. The system 600 includes spacecraft 610(1) and spacecraft 610(2). The stacked spacecraft system 600 includes a lower (aft) spacecraft 610(1) coupled with an upper (forward) spacecraft 610(2) by way of an inter-spacecraft coupling arrangement (not illustrated). As illustrated in Detail E, in the launch configuration, the stacked spacecraft system 600 may be disposed within a fairing 1000 of a launch vehicle which includes a payload dispenser 6035. Each spacecraft 610 may include a respective pair of solar arrays 612, shown, in the launch configuration, stowed close to a respective spacecraft sidewall.

Each of the spacecraft 610(1) and 610(2) has a respective forward-facing surface 616 and aft-facing surface 617, each of the forward-facing surface 616 and the aft-facing surface 617 being disposed transverse to the system's roll axis. The forward-facing surface 616(1) may be coupled with the aft-facing surface 617(2) by way of the inter-spacecraft coupling arrangement (not illustrated). Subsequent to orbit transfer operations as a stacked system 100, the spacecraft 610(1) and 610(2) may be separated. After separation, each spacecraft 610(1) and 610(2) may be configured to operate in a respective operational orbit (for example, a geosynchronous orbit) with respective surfaces 618(1) and 618(2) oriented in the Earth-facing direction, e.g., toward nadir. Surfaces disposed opposite thereto (not illustrated) may, accordingly be referred to as anti-Earth surfaces. In the illustrated implementation, the anti-Earth surfaces of one or both of the spacecraft 610(1) and 610(2) include a structural interface configured to be coupled, in the launch configuration, with payload dispenser 6035.

Detail F illustrates the stacked spacecraft system 600 in a second configuration suitable for orbit transfer operations, according to an implementation. In the illustrated implementation, spacecraft 610(2) is rotated with respect to spacecraft 610(1) such that the axis of rotation 614(1) of solar array 612(1) is at a substantial angle with respect to the axis of rotation 614(2) of solar array 612(2). As a result, a problem of solar array shadowing may be substantially reduced or eliminated.

Figure 7:
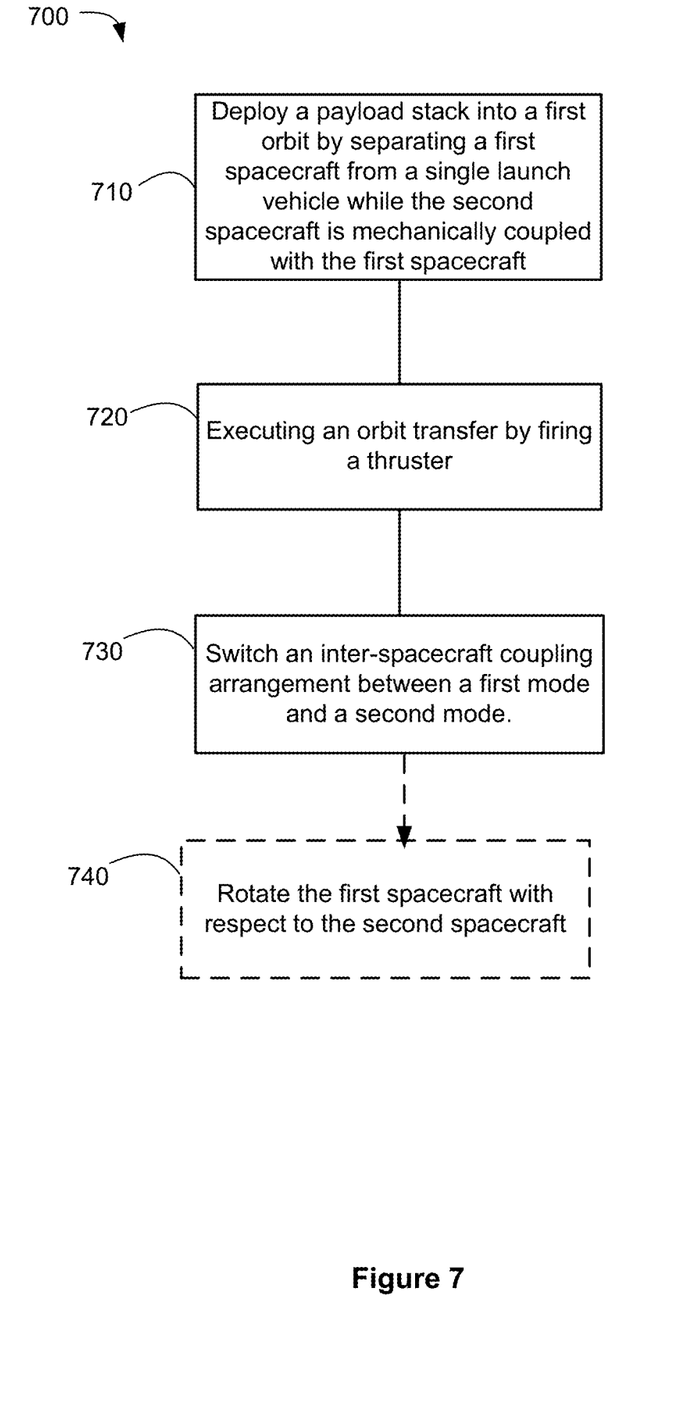
FIG. 7 illustrates an example of a method for transferring a stack of spacecraft into a second orbit, from a first orbit, according to an implementation.

Referring now to FIG. 7, a method 700 for transferring a stack of spacecraft into a second orbit, from a first orbit will be described. The method may begin, at block 710, by deploying the payload stack, following injection into a first orbit by a single launch vehicle. As described hereinabove the payload stack may include at least a first spacecraft and a second spacecraft configured to be disposed together, in a launch configuration, for launch by the single launch vehicle. Deploying the payload stack may include separating the first spacecraft from the single launch vehicle while the second spacecraft is mechanically coupled with the first satellite by way of an inter-spacecraft coupling arrangement.

The method 700 may continue, at block 720 with performing one or more firings of a thruster that delivers thrust along a thrust vector.

At block 730, the inter-spacecraft coupling arrangement may be switched between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the axis of rotation.

At block 740, optionally, the first spacecraft may be rotated with respect to the second spacecraft about the axis of rotation.

Thus, a stacked configuration of two or more spacecraft selectively rotatable with respect to each other has been disclosed. It will be appreciated that one of the spacecraft may be a reusable electric orbit transfer vehicle, for example. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
    at least two spacecraft, including at least a first spacecraft and a second spacecraft, and
    an inter-spacecraft coupling arrangement, the at least two spacecraft being mechanically coupled together, in a launch configuration, for launch by a single launch vehicle, by way of the inter-spacecraft coupling arrangement; wherein:
        in the launch configuration, the first spacecraft is mechanically coupled with a primary payload adapter of the launch vehicle;
        the system is configured to be deployed following injection into a first orbit by the launch vehicle, by separating the first spacecraft from the primary payload adapter while the second spacecraft is mechanically coupled, by way of the inter-spacecraft coupling arrangement, with the first spacecraft;
        the first spacecraft includes a thruster configured to execute an orbit transfer maneuver from the first orbit to a second orbit, the thruster delivering thrust along a thrust vector;
        each spacecraft includes a respective solar array, each respective solar array having a respective axis of rotation that is substantially orthogonal to the thrust vector;
        the inter-spacecraft coupling arrangement, after separating the first spacecraft from the primary payload adapter, is configured, in an on-orbit configuration, to be switchable between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation; and the first spacecraft is selectively rotatable with respect the second spacecraft such that the respective axis of rotation of the first solar array is at a substantial angle with respect to the respective axis of rotation of the second solar array.

2. The system of claim 1, wherein the first axis of rotation is approximately co-aligned with the thrust vector.

3. The system of claim 1, wherein the inter-spacecraft coupling arrangement includes one or both of flexible cabling and flexible propellant lines interconnecting the first spacecraft and the second spacecraft.

4. The system of claim 1, wherein the inter-spacecraft coupling arrangement is configured to commandably release and separate the second spacecraft from the first spacecraft.

5. The system of claim 1, wherein, in the launch configuration, the inter-spacecraft coupling arrangement fixedly couples the first spacecraft with respect to the second spacecraft.

6. The system of claim 1, wherein the inter-spacecraft coupling arrangement includes a V-band clamp.

7. The system of claim 1, wherein the inter-spacecraft coupling arrangement includes a motorized mechanism for rotating the first spacecraft with respect to the second spacecraft.

8. The system of claim 1, wherein the inter-spacecraft coupling arrangement excludes any mechanism for rotating the first spacecraft with respect to the second spacecraft.

9. The system of claim 1, wherein the system includes one or more thrusters or other attitude control actuators configured to rotate the first spacecraft with respect to the second spacecraft.

10. A method comprising:
    deploying a payload stack from a launch vehicle, the payload stack including at least a first spacecraft and a second spacecraft, and an inter-spacecraft coupling arrangement, the first spacecraft and the second spacecraft configured to be mechanically coupled together by way of the inter-spacecraft coupling arrangement, in a launch configuration, for launch by the launch vehicle, wherein deploying the payload stack includes separating the first spacecraft from the launch vehicle while the second spacecraft is mechanically coupled, by way of the inter-spacecraft coupling arrangement, with the first spacecraft;
    executing an orbit transfer maneuver by performing one or more firings of a thruster delivering thrust along a thrust vector, wherein each spacecraft includes a respective solar array, each respective solar array having a respective axis of rotation that is substantially orthogonal to the thrust vector; and
    switching the inter-spacecraft coupling arrangement between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation, wherein the first spacecraft is selectively rotatable with respect the second spacecraft such that the respective axis of rotation of the first solar array is at a substantial angle with respect to the respective axis of rotation of the second solar array.

11. The method of claim 10, further comprising rotating the first spacecraft with respect to the second spacecraft about the first axis of rotation.

12. The method of claim 10, wherein the inter-spacecraft coupling arrangement includes one or both of flexible cabling and flexible propellant lines interconnecting the first spacecraft and the second spacecraft.

13. The method of claim 10, wherein the inter-spacecraft coupling arrangement is configured to commandably release and separate the second spacecraft from the first spacecraft.

14. The method of claim 10, wherein the inter-spacecraft coupling arrangement includes a motorized mechanism for rotating the first spacecraft with respect to the second spacecraft.

15. A first spacecraft comprising:
a thruster; and
an inter-spacecraft coupling arrangement, wherein:
- the first spacecraft is configured to be launched, by a single launch vehicle, with a second spacecraft;
- in a launch configuration, the first spacecraft is mechanically coupled with a primary payload adapter of a launch vehicle; and the second spacecraft is mechanically coupled with the first spacecraft by way of the inter-spacecraft coupling arrangement;
- following injection into a first orbit by the single launch vehicle, the first spacecraft is separated from the primary payload adapter while the second spacecraft is mechanically coupled, by way of the inter-spacecraft coupling arrangement, with the first spacecraft;
- the thruster is configured to execute an orbit transfer maneuver from the first orbit to a second orbit, the thruster delivering thrust along a thrust vector;
- each spacecraft includes a respective solar array, each respective solar array having a respective axis of rotation that is substantially orthogonal to the thrust vector;
- the inter-spacecraft coupling arrangement, after separating the first spacecraft from the primary payload adapter, is configured, in an on-orbit configuration, to be switchable between a first mode and a second mode, the first mode permitting rotation of the first spacecraft with respect to the second spacecraft about a first axis of rotation that is approximately parallel with the thrust vector, the second mode preventing rotation of the first spacecraft with respect to the second spacecraft about the first axis of rotation; and
- the first spacecraft is selectively rotatable with respect the second spacecraft such that the respective axis of rotation of the first solar array is at a substantial angle with respect to the respective axis of rotation of the second solar array.

16. The first spacecraft of claim 15, wherein the inter-spacecraft coupling arrangement includes one or both of flexible cabling and flexible propellant lines interconnecting the first spacecraft and the second spacecraft.

17. The first spacecraft of claim 15, wherein the inter-spacecraft coupling arrangement is configured to commandably release and separate the second spacecraft from the first spacecraft.

* * * * *